(12) United States Patent
King

(10) Patent No.: US 8,240,584 B2
(45) Date of Patent: Aug. 14, 2012

(54) HOSE FRAME ASSEMBLY

(75) Inventor: Yueh-Hsun King, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 598 days.

(21) Appl. No.: 12/437,528

(22) Filed: May 7, 2009

(65) Prior Publication Data

US 2010/0206998 A1     Aug. 19, 2010

(30) Foreign Application Priority Data

Feb. 18, 2009  (CN) .......................... 2009 1 0300471

(51) Int. Cl.
*B05B 15/08* (2006.01)
(52) U.S. Cl. ..................... 239/587.2; 239/588; 239/195; 222/74; 174/68.1
(58) Field of Classification Search .................. 239/588, 239/587.5, 587.2; 138/120, DIG. 8, 119, 138/118, 110; 285/144.1; 242/403; 222/74; 137/355.12; 74/502.5, 501.5 R
See application file for complete search history.

(56) References Cited

U.S. PATENT DOCUMENTS

| | | | | |
|---|---|---|---|---|
| 3,162,214 A * | 12/1964 | Bazinet, Jr. | .................... | 138/120 |
| 4,108,211 A * | 8/1978 | Tanaka | ........................... | 138/120 |
| 5,254,809 A * | 10/1993 | Martin | ......................... | 174/68.1 |
| 5,555,769 A * | 9/1996 | Lichtenberg | ................. | 74/89.22 |
| 7,191,966 B2 * | 3/2007 | Sawczyszyn | ................. | 239/707 |

* cited by examiner

*Primary Examiner* — Len Tran
*Assistant Examiner* — Viet Le
(74) *Attorney, Agent, or Firm* — Altis Law Group, Inc.

(57) ABSTRACT

A hose frame assembly includes a pipe body, a wheel disc, a tensile adjusting device, and a cable. The pipe body includes three aligned pipe sections, and two resilient joints connected between every adjacent two of the three pipe sections. The tensile adjusting device is located between the pipe body and wheel disc, and includes a guide rail, two sliding members slidably mounted to the guide rail, and a resilient member connected between the sliding members. A wheel is rotatably mounted to each of the sliding members. Two ends of the cable extend through the pipe sections and the resilient joints and spacedly are fixed to an inner wall of one of the pipe sections located at a far end of the pipe body. A portion of the cable located out of the pipe body is positioned around the wheel disc and the wheels.

15 Claims, 2 Drawing Sheets

HOSE FRAME ASSEMBLY

BACKGROUND

1. Technical Field

The disclosure relates to hose frame assemblies.

2. Description of Related Art

In a numerical control machine, a hosepipe is employed for transferring cooling fluid or cooling air to cool workpieces and tools. A hosepipe can also be used to help removing cutting waste.

The hosepipe is usually mounted adjacent to and aimed at the workpiece. In a traditional numerical control machine, when the hosepipe is needed to be adjusted, a safety door must be opened, and then an operator enters the machine and manually operates the hosepipe. However, the machine has to be stopped when the door is opened, which may reduce producing efficiency. What's more, there is potential safety hazard for the operator to adjust the hosepipe in the machine.

DETAILED DESCRIPTION

Figure 1:
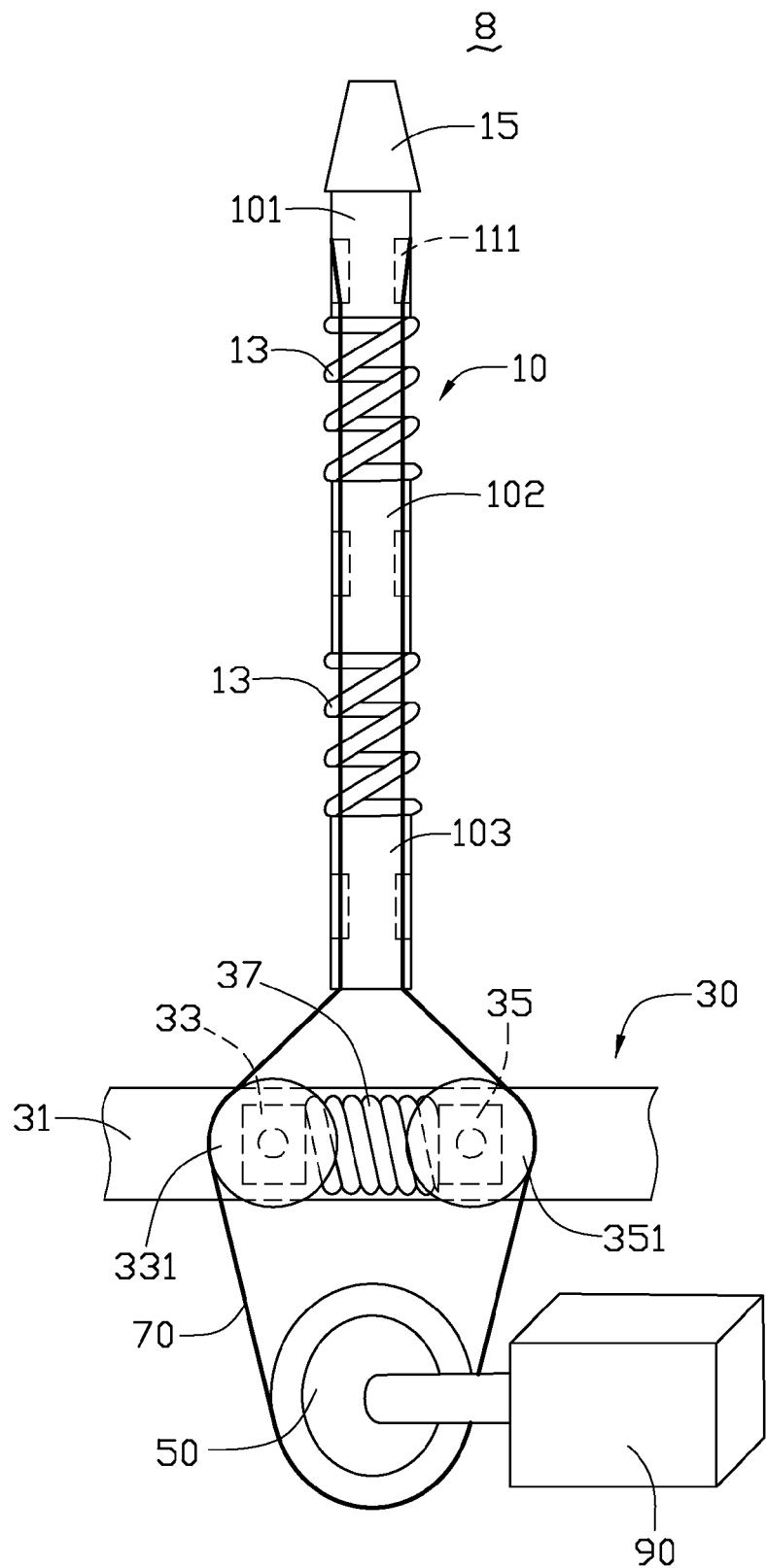
FIG. 1 is a schematic drawing of an embodiment of a hose frame assembly.

Referring to FIG. 1, an embodiment of a hose frame assembly 8 includes a pipe body 10, a wheel disc 50, a tensile adjusting device 30 located between the pipe body 10 and the wheel disc 50, and a cable 70.

The pipe body 10 includes a nozzle 15 at a far end of the pipe body 10, a first pipe section 101, a second pipe section 102, a third pipe section 103, and two resilient joints 13. Each of the pipe sections 101, 102 and 103 has an upper end and a lower end on opposite sides (not labeled). The resilient joints 13 are springs. One of the resilient joints 13 connects the lower end of the first pipe section 101 and the upper end of the second pipe section 102. The other one of the resilient joints 13 connects the lower end of the second pipe section 102 and the upper end of the third pipe section 103. The nozzle 15 is mounted to the upper end of the first pipe section 101. Each of the pipe sections 101, 102 and 103 includes two guide catches 111 formed on opposite sides of the inner wall and parallel to each other. The pipe body 10 is insertable with a fluid hose (not shown) or an air hose (not shown).

The tensile adjusting device 30 includes a guide rail 31, a first sliding member 33 slidably mounted to the guide rail 31, a second sliding member 35 slidably mounted to the guide rail 31, and a resilient member 37 connected between the first sliding member 33 and the second sliding member 35. The resilient member is a spring. A first wheel 331 is rotatably mounted to the first sliding member 33. A second wheel 351 is rotatably mounted to the second sliding member 35.

The middle portion of the cable 70 is looped around the wheel disc 50, thereby partitioning the cable 70 into a first cable segment (not labeled) and a second cable segment (not labeled). The first cable segment is traced around the first wheel 331, through the guide catches 111 of the third and second pipe sections 103 and 102 and the resilient joints 13 correspondingly and fastened to the guide catch 111 of the first pipe section 101, wherein the guide catches 111 are located at a same side of the pipe body 10. The second cable segment is traced around the second wheel 351, through the guide catches 111 of the third and second pipe sections 103 and 102 and the resilient joints 13 correspondingly and fastened to the guide catch 111 of the first pipe section 101, wherein the guide catches 111 are located at another same side of the pipe body 10.

It is noted that the inflexibility of each resilient joint 13 is stronger than an inflexibility of the resilient member 37. In a normal state, two portions of the cable 70 divided by the wheel disc 50 are equal in length, the resilient member 37 is compressed, and the pipe body 10 is substantially straight.

Figure 2:
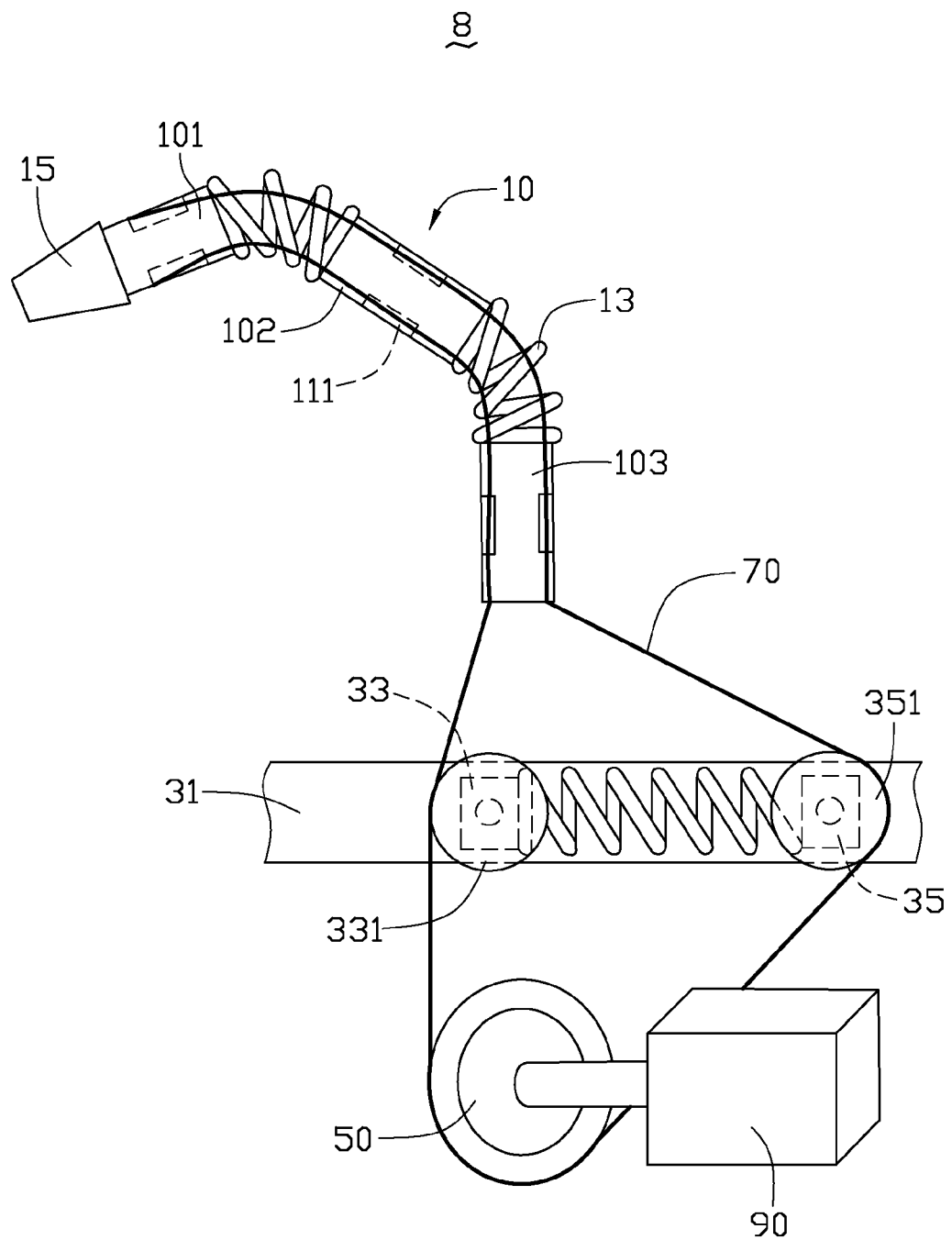
FIG. 2 is similar to FIG. 1, but showing the hose frame assembly in a different state.

Referring also to FIG. 2, in use, the wheel disc 50 provides friction to the cable 70. The wheel disc 50 is rotated to distort the cable 70, thus shortening and lengthening the two segments of the cable 70 correspondingly, thereby forming a shortened segment and lengthened segment simultaneously. The shortened segment tightens the resilient joints 13 while the lengthened segment loosens them, thus causing the resilient joints 13 to bend toward the side of the tightening segment. As a result the pipe body 10 curves along the side of the tightening segment. Further more the resilient member 37 expands towards the loosening segment, thereby pushing the second sliding member 35 and the second wheel 351 outwards the loosening segment to keep tension on the lengthened segment and preventing the cable 70 from disengaging with the wheels 331 and 351. Wherein, the guide catches 111 are employed to restrict a corresponding portion of the cable 70 in the pipe body 10, and in other embodiment, the guide catches 111 may be omitted.

In one embodiment, the wheel disc 50 is rotated by a servomotor 90. Thereby, electric control for the hose frame assembly 8 can be achieved. In other embodiments, the wheel disc 50 may be located outside a numerical control machine (not shown) and manually rotated, and therefore achieving hand control for the hose frame assembly 8. Thus, real-time control for the hose frame assembly 8 can be achieved either electrically or manually.

In other embodiments, the number of the pipe sections 101, 102 or 103 of the pipe body 10 may be increased, and number of the resilient joints 13 will be increased accordingly.

In other embodiments, the third pipe section 103 of the pipe body 10 may be omitted, and one of the resilient joints 13 will be omitted accordingly.

In other embodiments, the guide catches 111 of the pipe body 10 may be fixed to an outer wall of the corresponding pipe sections 101, 102 and 103, and therefore the corresponding portion of the cable 70 is located outside the pipe body 10.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hose frame assembly comprising:
   a pipe body comprising three pipe sections in an end to end connection, and two resilient joints connected between every adjacent two of the three pipe sections;
   a wheel disc;
   a tensile adjusting device located between the pipe body and the wheel disc, and comprising a guide rail, two sliding members slidably mounted to the guide rail, and a resilient member connected between the sliding members, wherein a wheel is rotatably mounted to each of the sliding members; and a cable comprising two ends, wherein the ends of the cable extend through the pipe sections and the resilient joints and are spacedly fixed to an inner wall of one of the pipe sections located at a far end of the pipe body, a portion of the cable located out of the pipe body is positioned around the wheel disc and the wheels;

wherein the wheel disc is rotated to distort the cable, thus shortening and lengthening two segments of the cable partitioned by the wheel disc, thereby forming a shortened segment and a lengthened segment simultaneously, and the pipe body curves along the side of the shortened segment, the resilient member pushes the wheel at the side of the lengthened segment to move towards the lengthened segment to maintain tension on the lengthened segment.

2. The hose frame assembly of claim 1, wherein two guide catches are fixed to each of the pipe sections to form two lines of guide catches, the ends of the cable extend along the two lines of guide catches respectively.

3. The hose frame assembly of claim 2, wherein the guide catches of each of the pipe sections are oppositely located.

4. The hose frame assembly of claim 1, further comprising a servomotor to rotate the wheel disc.

5. The hose frame assembly of claim 1, wherein a nozzle is fixed to the one of the pipe sections at the far end.

6. A hose frame assembly comprising:
a pipe body comprising at least two pipe sections, and at least one resilient joint each connected between adjacent two of the at least two pipe sections;
a wheel disc;
a tensile adjusting device located between the pipe body and the wheel disc, and comprising a guide rail, two sliding members slidably mounted to the guide rail, and a resilient member connected between the sliding members, wherein a wheel is rotatably mounted to each of the sliding members; and
a cable comprising two ends, wherein the ends of the cable extend through the at least two pipe sections and the at least one resilient joint and are spacedly fixed to one of the at least two pipe sections located at a far end of the pipe body, a portion of the cable located out of the pipe body is positioned around the wheel disc and the wheels;

wherein the wheel disc is rotated to distort the cable, thus shortening and lengthening two segments of the cable partitioned by the wheel disc, thereby forming a shortened segment and a lengthened segment simultaneously, and the pipe body curves along the side of the shortened segment, the resilient member pushes the wheel at the side of the lengthened segment to move towards the lengthened segment to maintain tension on the lengthened segment.

7. The hose frame assembly of claim 6, wherein two guide catches are fixed to each of the at least two pipe sections to form two lines of guide catches, the ends of the cable extend along the two lines of guide catches respectively.

8. The hose frame assembly of claim 7, wherein the guide catches of each of the at least two pipe sections are oppositely located.

9. The hose frame assembly of claim 6, further comprising a servomotor to rotate the wheel disc.

10. The hose frame assembly of claim 6, wherein a nozzle is fixed to the pipe body.

11. A hose frame assembly comprising:
a pipe body comprising at least two pipe sections, and at least one resilient joint each connected between adjacent two of the at least two pipe sections, wherein two guide catches are spacedly fixed to each of the at least two pipe sections to form two lines of guide catches;
a wheel disc;
a tensile adjusting device located between the pipe body and wheel disc, and comprising a guide rail, two sliding members slidably mounted to the guide rail, and a resilient member connected between the sliding members, wherein a wheel is rotatably mounted to each of the sliding members; and
a cable comprising two ends, wherein the ends of the cable extend through the two lines of guide catches respectively and are fixed to one of the at least two pipe sections located at a far end of the pipe body, a portion of the cable located out of the pipe body is positioned around the wheel disc and the wheels;

wherein the wheel disc is rotated to distort the cable, thus shortening and lengthening two segments of the cable partitioned by the wheel disc, thereby forming a shortened segment and a lengthened segment simultaneously, and the pipe body curves along the side of the shortened segment, the resilient member pushes the wheel at the side of the lengthened segment to move towards the lengthened segment to maintain tension on the lengthened segment.

12. The hose frame assembly of claim 11, wherein the guide catches are fixed to an inner wall of the far end pipe section.

13. The hose frame assembly of claim 11, wherein the guide catches of each of the at least two pipe sections are oppositely located.

14. The hose frame assembly of claim 11, further comprising a servomotor to rotate the wheel disc.

15. The hose frame assembly of claim 11, wherein a nozzle is fixed to the pipe body.

* * * * *